May 29, 1928.  1,671,732
W. P. MacMICKING
AUTOMOBILE SIGNAL
Filed June 11, 1927 2 Sheets-Sheet 1

Inventor
William P. MacMicking
By Stryker & Stryker
Attorney

May 29, 1928. 1,671,732
W. P. MacMICKING
AUTOMOBILE SIGNAL
Filed June 11, 1927 2 Sheets-Sheet 2
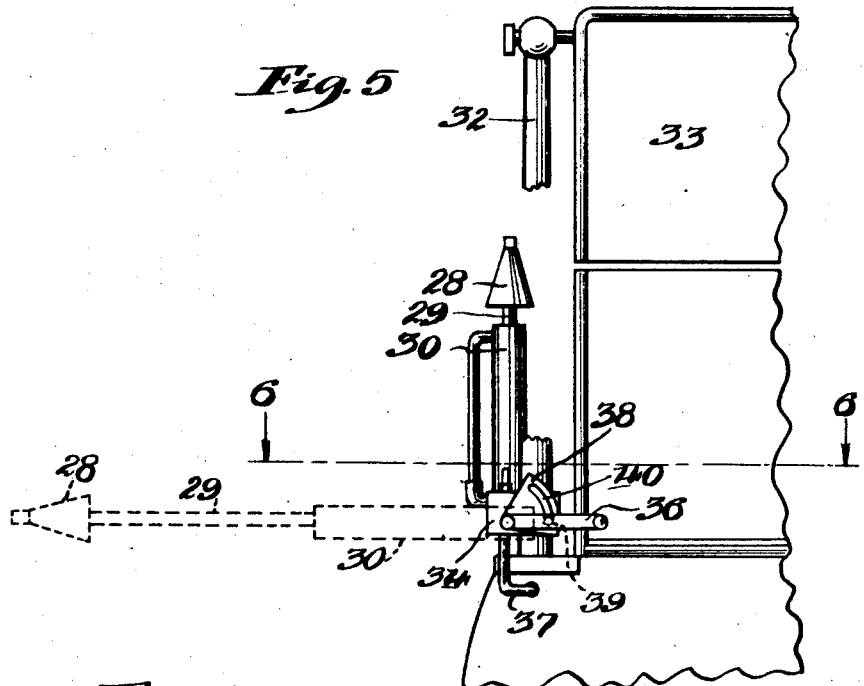
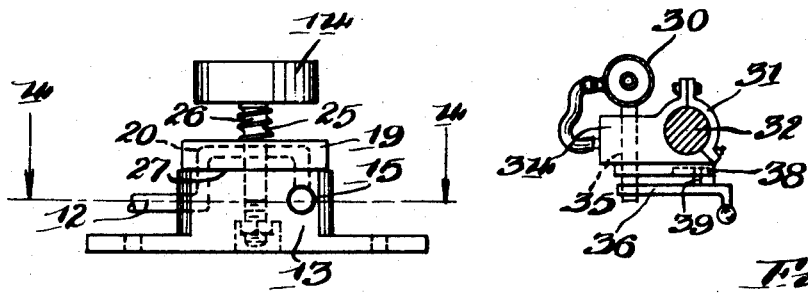
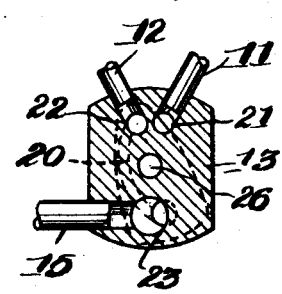
Inventor
William P. MacMicking
By Stryker & Stryker
Attorney Patented May 29, 1928.

1,671,732

UNITED STATES PATENT OFFICE.

WILLIAM P. MacMICKING, OF ST. PAUL, MINNESOTA.

AUTOMOBILE SIGNAL.

Application filed June 11, 1927. Serial No. 198,222.

It is the object of this invention to provide an unusually simple and efficient signal for use on an automobile to indicate turns, or stopping of the vehicle upon which the signal is mounted.

More particularly, it is my object to provide a signal which may be extended and retracted by air or gas operated means and having the further advantage of being unusually inconspicuous when retracted. The invention also includes certain other novel features of construction and arrangement of the parts which will be more fully pointed out in the following specification and claim.

Figure 1:
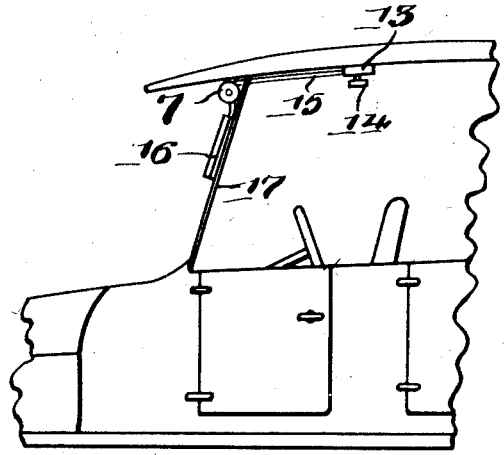
Figure 2:
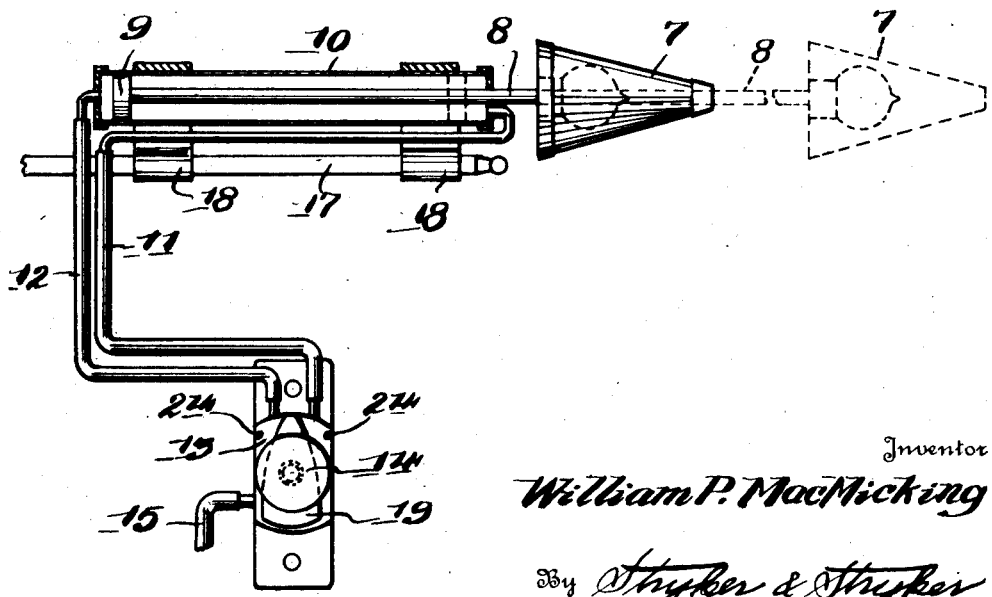

The accompanying drawings illustrate the best forms of my device at present known to me. In the drawings Figure 1 is a fragmentary side elevation of a motor vehicle with my improved signal mounted thereon; Fig. 2 is the bottom plan view of the signal partially in horizontal section; Fig. 3 is a detail side view of the valve for controlling the signal; Fig. 4 is a horizontal section taken on the line 4—4 of Fig. 3; Fig. 5 shows an alternate form of my invention mounted on a vehicle and as viewed from the seat of the vehicle driver looking forward, and Fig. 6 the horizontal section taken on the line 6—6 of Fig. 5.

In the preferred form of my invention shown in Figs. 1 to 4 inclusive, the signal proper, indicated by the numeral 7, is arranged to be illuminated in the usual manner and to be extended horizontally at the left side of a vehicle. A piston rod 8 supports the signal 7 upon its outer end and is fixed at its inner end to a piston 9 within a cylinder 10. Communicating with opposite ends of this cylinder 10 are tubes 11 and 12 for admitting air or gas at different pressures to opposite ends of the cylinder. A valve 13 having an operating knob 14 is connected to the tubes 11 and 12 and also connects with a tube 15 adapted to communicate with the intake manifold of an automobile engine of the common type. Otherwise the tube 15 may be connected with a source of air under pressure. As pneumatically operated wind-shield wipers, such as the wiper 16 shown in Fig. 1, are in present wide use, I have found that the connection for the tube 15 on many automobiles is conveniently located above the wind-shield 17 of the vehicle. Thus I prefer to mount the cylinder 10 in horizontal position above the wind-shield.

In the embodiment illustrated, suitable clamps 18 are provided for securing the cylinder to the upper frame member of the wind-shield 17.

The control valve 13 may be placed in any convenient location within easy reach of the driver of the vehicle. As shown in Fig. 1, this valve may be mounted on the roof of the vehicle above the driver's seat. The construction of the valve 13 is such that by operating the knob 14 a movable element 19 may be caused to place either the pipe 11 or pipe 12 in communication with the pipe 15. As shown in Figs. 3 and 4, a passageway 20 is formed in the movable element 19 to connect at one end with either a port 21 communicating with the tube 11 or with a port 22 communicating with the pipe 12. The opposite end of the passageway 20 is always in communication with a port 23 opening into the pipe 15. As shown in Fig. 2 stop pins 24 are provided to limit movement of the element 19. The construction of the valve is such that when the passageway 20 is in communication with the port 22, a port 21 is open to the outside air or atmospheric pressure and when the passageway 20 communicates with the port 21, port 22 is opened to atmospheric pressure. To hold the movable element 19 of the valve firmly upon its seat 27, a coiled spring 25 is provided on a spindle 26 connecting the knob 14 with the element 19.

In the alternate form of my device, shown in Figs. 5 and 6, I provide a signal 28 similar to the signal 7 and this signal 28 is supported upon a piston rod 29 which is movable by a piston in a cylinder 30, similar to the cylinder 10 but of shorter length. The cylinder 30 is supported by a clamp 31 adapted to be secured to any convenient part of the vehicle such as one of the supporting posts 32 of the wind-shield 33. Projecting outward from the post 32 is a bearing which is attached to the clamp 31 and arranged to support a horizontal shaft 35. The base of the cylinder 30 is rigidly mounted on one end of this shaft 35 and the other end of said shaft is fitted with an operating lever 36 adapted to be manipulated to tilt the cylinder 30 from vertical to the horizontal position indicated in dotted lines in Fig. 5. Tubes similar to the tubes 11 and 12 of the preferred construction are provided for admitting air to opposite ends of the cylinder 30 and a pipe 37 is arranged to communicate with the intake manifold of the vehicle or with a source of air under pressure, corresponding to the pipe 15 of the preferred construction. A valve 34, similar in its function to the valve 13, is located adjacent to the lever 36, being provided with a movable element 38 corresponding to the element 19 shown in Figs. 3 and 4. This element 38 is arranged to be operated by a pin 39 projecting from the lever 36 and extending into a slot 40 in said element.

Operation.

In use I prefer to mount the cylinder 10 of the preferred construction in such horizontal position that the signal 7 does not, when retracted, project beyond the side of the vehicle. The operation is as follows, assuming that the pipe 15 is in communication with a suction element, such as an intake manifold. To extend the signal 7 horizontally at the side of the vehicle, the knob 14 of the valve 13 is turned to the right or in clockwise direction as viewed in Fig. 2, so as to place the pipe 11 in communication with the pipe 15 and to open the pipe 12, admitting thereto air at atmospheric pressure. Thus the reduced pressure upon one side of piston 9 allows air at atmospheric pressure to force the piston to the right and extend the rod 8 carrying the signal 7. When it is desired to retract the signal the knob 14 is turned toward the left to connect the pipe 12 to the pipe 15 and simultaneously open the pipe 11 to receive outside air. Thus the piston 9 is forced back to normal or retracted position.

The operation of the alternate form of the device, shown in Figs. 5 and 6, is as follows. When it is desired to extend the signal 7, the lever 36 is moved through an arc of 90 degrees or from horizontal to vertical position, thus turning the shaft 35 carrying the cylinder 30 and bringing the cylinder to the horizontal, dotted line position shown in Fig. 5. During the first part of the movement of the lever 36 the pin 39 moves in the arcuate slot 40 without operating the element 38. As the lever 36 approaches its vertical position the pin 39 strikes the upper end of the slot 40 and further movement of the lever carries the element 38 through an arc. This operates the valve 34 to admit air to the base of the cylinder 30 and create suction in the pipe connected to the normally upper end of the cylinder. The piston rod 29 carrying the signal 28 is thus extended as shown in dotted lines in Fig. 5. To retract the signal the lever 36 is merely returned to horizontal position. This operates the element 38 of the valve 34 in the reverse direction with the result that the rod 29 carrying the signal is retracted into the cylinder 30 and said cylinder is returned to vertical position.

If a source of compressed air or gas is available on the vehicle, the pipe 15 of the preferred construction or pipe 37 of the alternate form of the invention may be connected to such source and the signal operated by pneumatic pressure above atmospheric rather than by suction as above described. It will now be understood that my device is of such simple construction that the parts will not readily get out of order or require adjustment. The signal is equally well adapted for use upon open and closed types of vehicles.

Having described my invention what I claim is new and desire to protect by Letters Patent is:

In an automobile signal, a pneumatic cylinder rigidly mounted in horizontal position above the wind-shield of the vehicle, a piston in said cylinder, a piston rod projecting from said cylinder, a signal on the outer end of said rod, pneumatic tubes for admitting air to opposite ends of said cylinder, a suction tube and a valve arranged to admit air at atmospheric pressure to one of said pneumatic tubes and to connect the other tube with said suction tube whereby the operation of said piston may be controlled and said signal extended or retracted.

In testimony whereof, I have hereunto signed my name to this specification.

WILLIAM P. MacMICKING.